Figure 1:
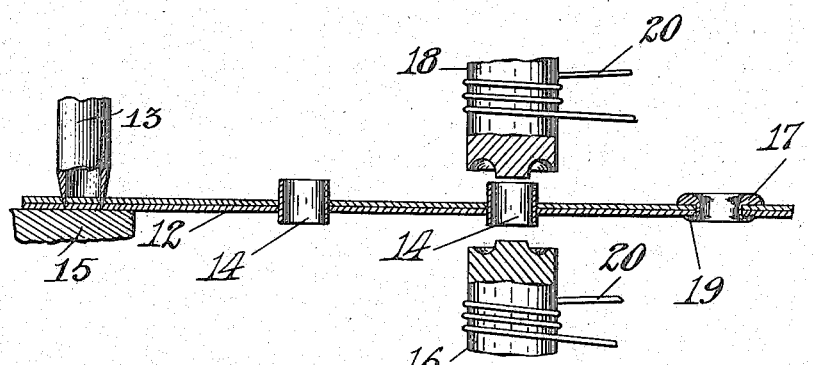

E. KEMPSHALL.
METHOD OF FORMING AND INSERTING EYELETS AND THE LIKE.
APPLICATION FILED OCT. 1, 1909.

1,122,280.

Patented Dec. 29, 1914.

UNITED STATES PATENT OFFICE.

ELEAZER KEMPSHALL, OF LONDON, ENGLAND, ASSIGNOR TO UNITED FAST COLOR EYELET COMPANY, OF PORTLAND, MAINE, A CORPORATION OF MAINE.

METHOD OF FORMING AND INSERTING EYELETS AND THE LIKE.

1,122,280. Specification of Letters Patent. Patented Dec. 29, 1914.

Application filed October 1, 1909. Serial No. 520,445.

*To all whom it may concern:*

Be it known that I, ELEAZER KEMPSHALL, a citizen of the United States, residing at London, in the county of London, England, have invented certain Improvements in Methods of Forming and Inserting Eyelets and the like, of which the following description, in connection with the accompanying drawings, is a specification, like reference characters on the drawings indicating like parts in the several figures.

This invention relates to eyelets, studs, tubular rivets or the like, and more particularly to an improved method of forming such fastening devices from plastic material and setting them in sheet material such as upper leather for boots and shoes.

Heretofore it has been customary to form the head of a plastic-head stud or eyelet and otherwise complete the eyelet before setting it in the work. The commercial method of producing such studs or eyelets has consisted in first forming a metallic eyelet having a barrel of the shape desired in the finished eyelet and a flange on one end of the barrel, cutting a sheet of plastic material into blanks of the proper size and finally molding such plastic blanks about the flange thus forming the finished eyelet. This procedure necessitates elaborate machinery for the manufacture of the eyelets and also for handling them and properly presenting them to the devices for inserting and setting them in the work. The present invention, however, contemplates a method of forming and setting plastic-head eyelets or the like in accordance with which the final shaping of the eyelets is effected simultaneously with the setting operation. Such a method possesses marked advantages from an economical standpoint in that the eyelet stock may be manufactured in the form of tubes or rods of celluloid or other plastic material and handled in this form or cut into suitable short sections forming hollow cylinders or disks. In either case waste in the production of the eyelets is avoided, since all the material of the original tubes or rods enters into the finished articles, whereas in those processes in which a head is formed from sheet material the waste in plastic material is very great. A saving in time also results since the operation of forming a head for the eyelet or fastening device as a distinct step is avoided. Having produced the blanks for the fasteners in the form of cylinders or disks it will be obvious that articles of such shapes may be handled and delivered to the setting devices more readily and by simpler mechanism than that required for handling ordinary eyelets which eyelets must be delivered with their heads or flanges in a predetermined relation to the work.

The final steps in the present method consist in placing a blank in the work, preferably in a previously formed opening in the work, heating the blank to soften the plastic material and molding the ends of the blank to form a head on one side of the work and a retaining or securing flange on the other side.

If desired, a ring or washer may be placed concentrically with respect to the blank so that the head of the eyelet may be molded over and about the ring, thus reinforcing the head portion of the eyelet.

In addition to the advantages above referred to a further important advantage of practising the present method is that the retaining or securing flange of the eyelet produced by this method is smooth and continuous instead of ragged and broken as is the retaining portion of most eyelets having metallic barrels. Such a continuous retaining flange, beside securing a better hold on the work in which the eyelet is set, presents a better appearance in the finished work and affords a smoother surface on that side of the work next the apparel of the wearer.

Another advantage incident to the present novel method of setting a plastic fastener after the blank has been inserted in the work is that the heads or flanges so formed are forced against the opposite surfaces of the work while in a plastic condition and therefore are molded into perfect contact with the surface of the work.

The advantages above set forth and others incident to the invention will be best understood and appreciated from the following description of preferred methods of practising the invention, together with the accompanying drawings, in which:—

Figure 2:
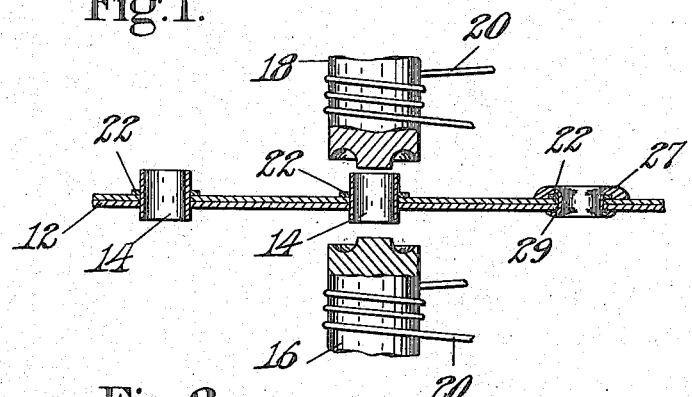

Figure 1 is a view on an enlarged scale illustrating the steps in a preferred manner of practising the present invention; Fig. 2 is a similar view illustrating an alternative step.

The work 12 in which the eyelets or studs are to be set, and which is shown as two layers of sheet material such as the quarter and facing stay of a boot, is first punched to provide openings in which the headless blanks 14 may be inserted. In order to make the present description clearer, the operations of punching the work 12 and inserting the blanks 14 are indicated as if performed independently of the forming dies 16 and 18 although, in the practice of the present invention the blanks may be inserted at any time before the clenching or setting operation and it may be found desirable to so construct and arrange the dies that the blanks 14 may be delivered to and inserted by one of these elements as in an ordinary eyeleting machine. A tubular punch 13 and a coöperating cutting block 15 are shown in Fig. 1 of the drawings, as arranged for operation at one side of the dies 16 and 18.

As herein shown the blanks 14 comprise short sections of celluloid tube and may be produced readily as a commercial article, either by molding them in the desired shape or by cutting them from a long rod or tube. The sections are of about the internal diameter required in the finished eyelet and are of such length as to allow sufficient stock for forming the head and retaining flange of the eyelet.

In order to heat the blanks sufficiently to soften the celluloid so that it may be molded the forming dies 16 and 18 are heated, preferably electrically heated, as conventionally indicated by the wires 20 shown in the drawings.

When the forming dies are forced together the ends of the blanks are heated and the material is caused to flow outwardly and axially, the dies thus upsetting and spreading the ends of the blank and molding a rounded head 17 on one side of the work and a continuous retaining flange 19 on the other side. It will be apparent, however, that the head and flange may be shaped by the forming dies to suit the requirements of the work and, if desired, may be shaped similarly to the flanges of eyelets heretofore employed in similar work.

It may be desirable in certain classes of work to produce an eyelet with a reinforced head or one having a larger head than the eyelet produced by the method as above set forth. An alternative step in the practice of the present invention is, therefore, indicated in Fig. 2. As there shown a ring or washer 22 is located concentrically with respect to each blank 14 before the setting operation and the head 27 of the eyelet is molded over and about the washer by the forming dies 16 and 18. A smooth retaining flange 29 is simultaneously formed on the other side of the work by the forming dies. In both cases the projecting center portions of the dies enter the bore of the plastic blank during the setting or molding operation and maintain an opening through the blank.

Having now described my invention what I claim as new and desire to secure by Letters Patent of the United States is:—

1. The method of forming and setting eyelets or the like which comprises inserting in the work a tube consisting of plastic material and having a uniform cross-section throughout its length, then heating both ends of the tube to soften the plastic material, and simultaneously molding against the opposite surfaces of the work the softened material of both ends of the tube by pressure on the ends and inner surface thereof, thus forming eyelet flanges while maintaining an opening through the tube.

2. The method of setting eyelets or the like in sheet material which consists in inserting a cylindrical blank of plastic material in the work, placing a washer concentrically with respect to the blank, and simultaneously molding a head on one end of the blank over said washer and a retaining flange on the other end of the blank by means of hot forming dies.

3. The method of forming and setting eyelets or the like which consists in placing a short tube of plastic material in an opening formed in the material, locating a washer concentrically with respect to said tube adjacent to one surface of the material, simultaneously upsetting and spreading both ends of said tube, and molding a rounded head on one end of the tube over the washer and a flange upon the other end of the tube.

4. The method of forming and setting eyelets or the like in sheet material which consists in producing a headless blank of plastic solid material, inserting the blank in the work, placing a washer around the blank, forming a head on one end of the blank for engaging one surface of the work and forming a flange on the other end of the blank for engaging the other surface of the work and holding the washer permanently in place.

In testimony whereof I have signed my name to this specification in the presence of two subscribing witnesses.

ELEAZER KEMPSHALL.

Witnesses:
HERBERT W. KENWAY,
ARTHUR L. RUSSELL.